United States Patent [19]

McIntosh

[11] Patent Number: 5,623,662

[45] Date of Patent: Apr. 22, 1997

[54] REVENUE SHARING SYSTEM WITH DATA FILTERING USING HISTORY, PERIODIC, AND EXCLUSION DATABASES

[75] Inventor: Matthew S. McIntosh, Garland, Tex.

[73] Assignee: Supercomm, Inc., Dallas, Tex.

[21] Appl. No.: 583,862

[22] Filed: Jan. 9, 1996

Related U.S. Application Data

[63] Continuation of Ser. No. 167,504, Dec. 15, 1993, abandoned.

[51] Int. Cl.⁶ .................................................. G06F 17/30
[52] U.S. Cl. .................................. 395/619; 364/DIG. 1; 364/282.1
[58] Field of Search .................................................. 395/600

[56] References Cited

U.S. PATENT DOCUMENTS

| | | | |
|---|---|---|---|
| 4,315,309 | 2/1982 | Coli | 364/200 |
| 4,435,759 | 3/1984 | Baum et al. | 364/200 |
| 4,510,619 | 4/1985 | LeBrun et al. | 382/57 |
| 4,646,229 | 2/1987 | Boyle | 395/600 |
| 4,972,504 | 11/1990 | Daniel, Jr. et al. | 455/2 |
| 5,062,055 | 10/1991 | Chinnaswamy et al. | 364/513 |
| 5,086,397 | 2/1992 | Schuster et al. | 364/468 |
| 5,092,840 | 3/1992 | Healy | 604/83 |
| 5,101,447 | 3/1992 | Sokoloff et al. | 382/61 |
| 5,187,750 | 2/1993 | Behera | 382/7 |
| 5,191,525 | 3/1993 | LeBrun et al. | 364/419 |
| 5,220,501 | 6/1993 | Lawlor et al. | 364/408 |
| 5,227,614 | 7/1993 | Danielson et al. | 235/380 |
| 5,235,654 | 8/1993 | Anderson et al. | 382/61 |
| 5,245,429 | 9/1993 | Virginio et al. | 358/142 |
| 5,247,517 | 9/1993 | Ross et al. | 370/85.5 |
| 5,265,033 | 11/1993 | Vajk et al. | 364/514 |
| 5,287,496 | 2/1994 | Chen et al. | 395/600 |
| 5,333,316 | 7/1994 | Champagne et al. | 395/600 |
| 5,347,653 | 9/1994 | Flynn et al. | 395/600 |

OTHER PUBLICATIONS

Cowart, Mastering Windows 3.1, Sybex Inc. 1992, pp. 909-910.

*Primary Examiner*—Wayne Amsbury
*Attorney, Agent, or Firm*—Gregory M. Howison; Joseph Shallenburger

[57] ABSTRACT

A method and system for extracting revenue information from a point-of-sale (POS) terminal for purposes of revenue sharing including the step of periodically selecting and extracting predetermined portions of revenue transaction data in a proprietary database. This system allows extrapolation of select data relating to revenue traffic in a rental system. Revenue stored in a proprietary database (40) by a proprietary point-of-sale operating program is periodically selected, extracted and stored in a periodic database (42). This data is compared to a history database (38) comprising the periodic database as it existed prior to a given time. The data is output from the periodic database that is not present in the history database at the given time. This data can be transmitted to a remote location. The proprietary point-of-sale operating program can be used to create a history report database from the revenue transaction data and the portions of the revenue transaction data can be selected and extracted from the history report database.

40 Claims, 5 Drawing Sheets bra
REVENUE SHARING SYSTEM WITH DATA FILTERING USING HISTORY, PERIODIC, AND EXCLUSION DATABASES This application is a Continuation of application Ser. No. 08/167,504, filed Dec. 15, 1993, now abandoned.

TECHNICAL FIELD OF THE INVENTION

The present invention pertains in general to revenue sharing systems, and more particularly, to a revenue sharing system that operates in parallel with a Point of Sale terminal.

BACKGROUND OF THE INVENTION

Point of Sale (POS) terminals have typically been utilized to maintain a real-time running status of inventory, sales activity and price changes. However, in recent years, these Point of Sale terminals have also been utilized to track information regarding revenue sharing aspects of certain merchandise in which more than one party has an interest.

One example of a revenue sharing scheme is that involved with respect to the renting of home videos. In the home video renting market, a retailer purchases from a supplier videotapes for select programs which he then rents. When the videotapes are received, the vendor places a bar code on the videos, codes this bar code into his system, and then places it on a shelf. When a customer rents the video, the bar code on the video is scanned, and the status of the video altered within the local database to indicate that it has been rented. When it is returned, it is then scanned again to place it back into the rental inventory. The system provides a retailer with knowledge of the number of tapes that are in his rental inventory, the number of tapes that are rented and the number of tapes that are overdue and the individuals that have these tapes. This allows the retailer to assess the type of traffic that he has with respect to particular videos, etc.

In conventional marketing schemes with respect to video rentals, the retailer must incur considerable expense in accounting for particular videos, games, etc. For example, the cost of the video may be as much as twenty times the single rental rate for the video. If a video rents for $3.00, the purchase price might be as high as $60.00. Therefore, the retailer must rent the video a minimum of twenty times to break even. Of course, with a very popular title, the retailer can rent this well over one hundred times, if not more. The problem, however, is for the retailer to acquire sufficient copies of a particular title, yet not overbuy and fail to recover his investment. Unfortunately, the retailer cannot assess the public's reception of the title until it is on the shelf. As such, the retailer may have incurred significant costs and is therefore reluctant to place significant investments into the actual purchase of sufficient titles and copies to place into the rented inventory. Of course, the popularity of a given program is relatively short and it is difficult to assess the number of videotapes to meet a given demand for a particular title, as this demand can drop off very rapidly.

With revenue sharing schemes, the supplier can provide to the retailer tapes at a much reduced cost, since the actual production costs of the videotape are relatively low compared to the wholesale cost. In return for the reduced cost, the suppliers receive a share of the rental revenues on the "revenue shared" tapes. In return for the reduced cost, the suppliers receive a share of the rental revenues on the "revenue shared" tapes. Retailers can therefore place more videotapes into their rental inventories and the suppliers can insure that a far greater of videotapes for a popular title are in the rental inventory.

A disadvantage to revenue sharing systems is that it is difficult for a supplier that has an interest in the revenue sharing to monitor rental at a retailer to insure that they are getting their proper portion of the revenue. Additionally, most retailers have a standard Point of Sale terminal that "locks" them into a given system which may not be compatible with different suppliers. The reason for this is that different suppliers use different bar codes or coding techniques, different serial numbers, etc., than would a vendor. This situation is further exacerbated by the fact that most Point of Sale terminals cannot accommodate a revenue sharing scheme without significantly rewriting the software and providing communications. One solution to this problem has been to provide an intercept box that is disposed between the Point of Sale terminal and the printer to intercept information that is transferred to the printer. By examining the fields in the print output, information can be gleaned as to what transactions have occurred. This information then can be converted into a second database and stored locally or transferred to a remote location. However, this system requires completely separate hardware and is subject to whether a printout has been ordered for a given transaction.

SUMMARY OF THE INVENTION

The present invention disclosed mid claimed herein comprises a method and system for accessing revenue transaction data from a proprietary database to selectively extract the revenue transaction data therefrom, the revenue transaction data having a unique format associated therewith. A selection and extraction device is provided for periodically selecting and extracting predetermined portions of the revenue transaction data from the proprietary database at a given time in accordance with a selection template that defines the predetermined portions. A first storage device is provided for storing as a periodic database the selected, predetermined portions of the revenue transaction data. A first processing device is provided for generating a history database comprising the periodic database as it existed prior to the given time and a second storage device is provided for storing the history database. A second processing device is provided for comparing the periodic database at the given time to the history database and outputting as output data only the data in the periodic database that is not present in the history database at a given time. An exclusion device having an associated exclusion database is provided containing information corresponding to undesired data, such that the system only outputs data that does not correspond to the information in the exclusion database. A transmitting device is also provided to transmit the output data to a remote location.

In another aspect of the present invention, the program that created the revenue transaction data and stored it in a proprietary database is provided for creating a history report database from the revenue transaction database. A selection and extraction device is provided for periodically selecting and extracting predetermined portions of the revenue transaction data from the history report database at a given time in accordance with a selection template. A first storage device is provided for storing as a periodic database the predetermined portions of the history report database. A first processing device is provided for generating a history database comprising the periodic database as it existed prior to a given time and a second storage device is provided for storing the history database. A second processing device is provided for comparing the periodic database at the given time to the history database and outputting as output data only the data in the periodic database that is not present in the history database at the given time. An exclusion device having associated with it an exclusion database is provided containing information corresponding to undesired data and outputting only data which does not correspond to the information in the exclusion database. A transmitting device is provided for transmitting the output data to a remote location.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
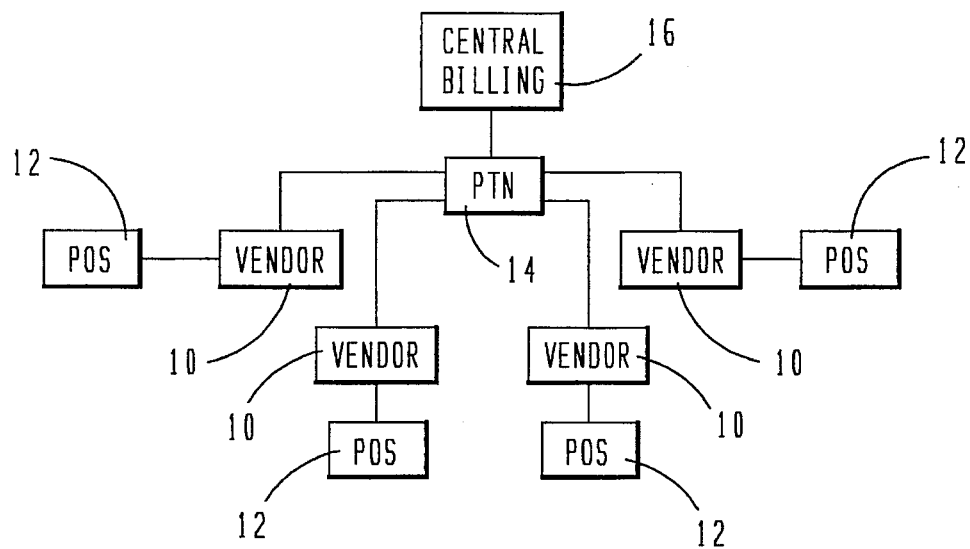
FIG. 1 illustrates an overall block diagram of the distribution of the vendors routed to the central billing station.

Referring now to FIG. 1, there is illustrated an overall block diagram of a centralized revenue sharing system. The revenue sharing system utilizes a plurality of remotely disposed vendors 10, each having a Point of Sale (POS) terminal 12 disposed thereat. Each of the vendors 10 has associated therewith a rental inventory with the POS terminal 12 operable to log transactions into and out of the rental inventory. The revenue associated with this transfer out of the rental inventory is transferred from each of the vendors 10 through a Public Telephone Network (PTN) 14 to a central billing station 16. The central billing station 16 is primarily concerned with the revenue sharing aspect and not the overall profit or inventory of the vendor. Each of the POS terminals 12 can be different and each can have a separate coding system for managing their own inventory.

Figure 2:
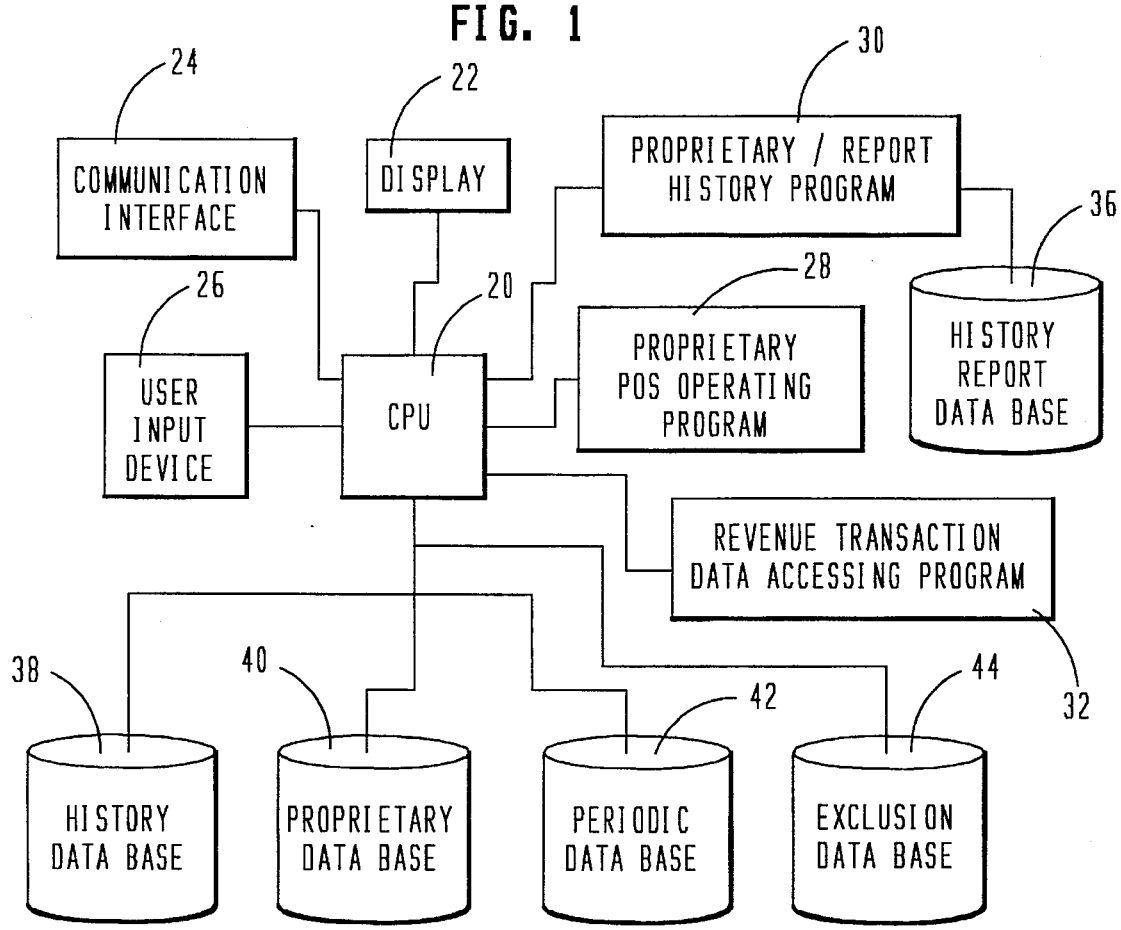
FIG. 2 illustrates a block diagram of the hardware and software of the point-of-sale terminal in the system of the present invention.

Referring now to FIG. 2, there is illustrated a block diagram of the hardware and software of the POS terminal 12 and the system of the present invention. The POS terminal 12 is comprised of a central processing unit (CPU) 20 at the center thereof, which can be a personal computer or a similar type processor. The CPU 18 has associated therewith a display 22. The CPU 20 is also connected to a communication interface device 24, such as a modem, which is connected through the public telephone network (PTN). The CPU 20 is also connected to a user input device 26, such as a keyboard, to allow input of information thereto. The CPU 20 is connected to a local memory containing a proprietary POS operating program 28, a proprietary history report program 30 and the revenue transaction data access program 32. The local memory is also operable to store a history report database 36, a history database 38, a proprietary revenue transaction database 40, a periodic database 42 and an exclusion database 44.

In operation, when a user inputs information in a user input device 26, the proprietary POS operating program 28 causes the CPU 20 to process this information and display this information on the display 22. The proprietary POS operating program 28 then stores the results of the transaction as revenue transaction data in the proprietary database 40. This information can either be left in the proprietary database 40 or the proprietary history report program 30 can be run and a history report database 36 will be created by this program. The information stored in the proprietary database 40 is, for example, billing information, information about the product, the customer's address, etc. Once the revenue transaction data has been stored in the proprietary database 40, the revenue transaction data accessing program 32 can be run at any time.

Figure 3:
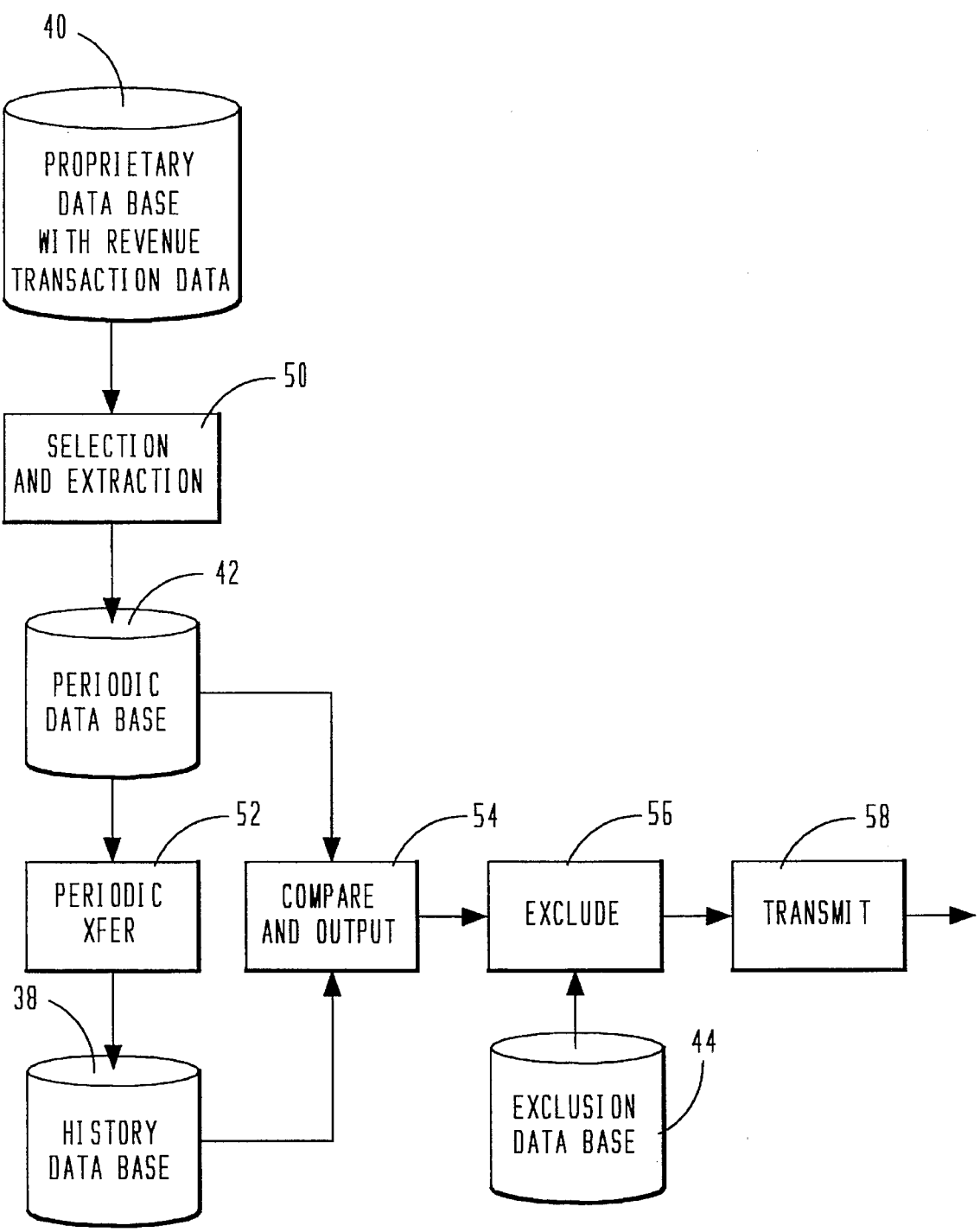
FIG. 3 illustrates a block diagram of the process flow of the system of the present invention.

Referring now to FIG. 3, there is illustrated a block diagram of the process flow of the present invention. Each proprietary POS operating system has a unique format in which it stores revenue transaction data in its proprietary database. This format defines the structure and organization of the associated proprietary database 40 and the commands and instructions necessary to interface therewith. A selection template must be designed to find the needed portions of the revenue transaction data in the associated database in accordance with the unique format. Revenue transaction data stored in the proprietary database 40 is selected and extracted at a given time by a selection and extraction routine 50, in accordance with a selection template that defines the needed portion of the revenue transaction data and how to extract it. The extracted portions of this data are then stored in the periodic database 42. A periodic transfer routine 52 transfers the data in the periodic database 42 prior to the given time, to the history database 38. A comparing routine 54 compares the periodic database 42 at the given time to the history database 38 and outputs as output data only the data in the periodic database 42 that is not present in the history database 38 at the given time. An exclusion routine 56, having associated with it an exclusion database 44 containing information corresponding to undesired data, excludes from the output data any data which corresponds to information in the exclusion database 44. The remaining output data can then be transmitted by a transmitting device 58, such as a modem, to a remote location such as a central billing station.

Figure 4:
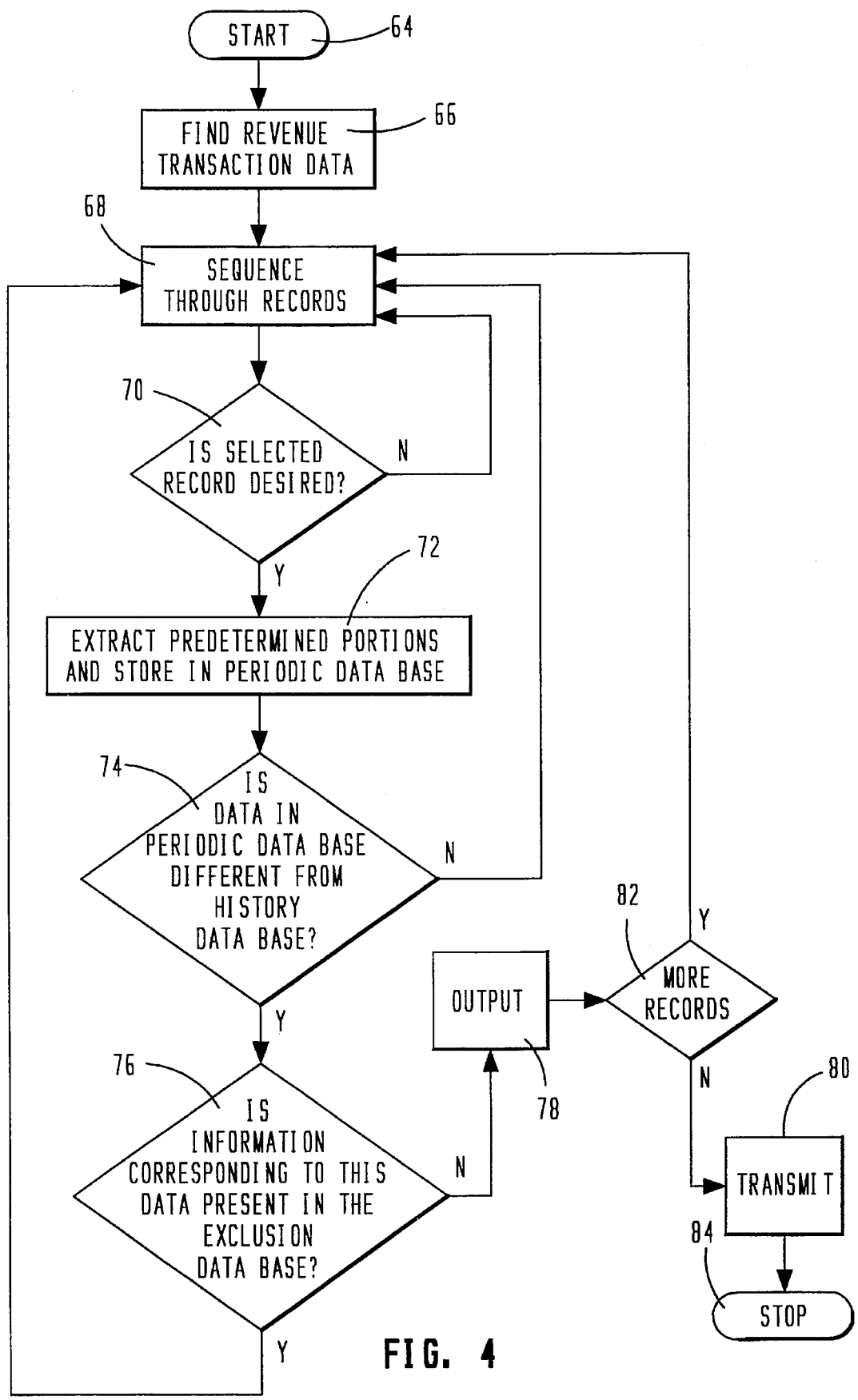
FIG. 4 represents a block diagram of the process flow of an alternate embodiment of the system of the present invention.

Referring now to FIG. 4, there is illustrated a flowchart for the overall system of the present invention. The routine is initiated at a start block 64. The routine is initiated by a predetermined instruction during the operation of the proprietary POS program that generates the revenue transaction data, in response to a menu selection from the proprietary POS program, or it is initiated at a predetermined time, or when the proprietary POS program is exited. After the system is initiated at start block 64, it then proceeds to function block 66 where the system finds the revenue transaction data located in the proprietary database. After the revenue transaction data is found, the routine proceeds to function block 68 to sequence through the records of the revenue transaction data. The routine then flows to a decision block 70 to determine whether the selected record is desired. If not the program flows along an "N" path back to function block 68, where it sequences through the records to the next record of revenue transaction data. If the selected record is a desired record, the routine flows along a "Y" path from decision block 70 to a function block 72 to extract predetermined portions of the transaction data and store these predetermined portions of the record in the periodic database 42. The routine then proceeds to a decision block 74 to determine if the data in the periodic database 42 is different from the data in the history database 38. If not, the routine flows along an "N" to function block 68 and sequences through the records to the next revenue transaction data record. If the data in the periodic database 42 is different from the data in the history database 38, the routine flows along a "Y" path from the decision block 74 to decision block 76 to determine whether the information corresponding to this data is present in the exclusion database 44. If it is, the routine flows along a "Y" path from decision block 76 to function block 68 where it begins to sequence through the revenue transaction data records to the next revenue transaction data record. If the information is not in the exclusion database 44, the routine flows along an "N" path to function block 78 where the information is output. The routine then flows to a decision block 82 to determine whether there are more records present in the proprietary database. If there are more records, the routine flows along a "Y" path from the decision block 82 to the function block 68 and continues to sequence through the records. If there are no more records, the routine flows along an "N" path to function block 80 where the information is transmitted to a remote location. After the information is transmitted in function block 80, the routine then flows to a stop block 84.

Figure 5:
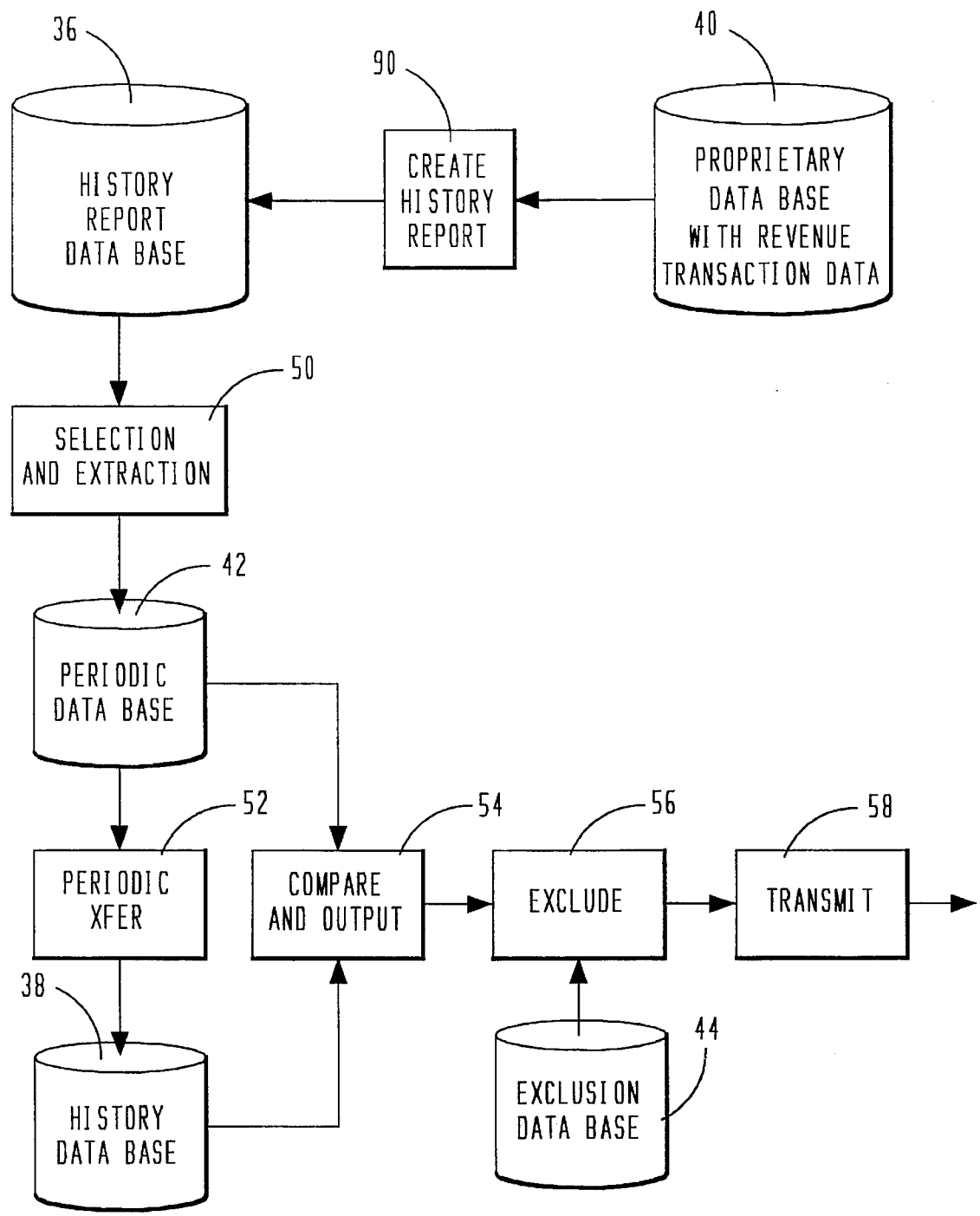
FIG. 5 illustrates a flowchart for the system of the present invention.

Referring now to FIG. 5, there is illustrated a block diagram showing the process flow of an alternate embodiment of the system of the present invention. In this alternate embodiment, the proprietary POS operating program is used to run a proprietary history report program to create a history report 90 of the revenue transaction data. One way that this may be done is by running a TSR that recreates the keyboard strokes needed to print out a history report. The print output is directed to a data file and stored as the history report database 36. The selection and extraction routine 50 then periodically selects and extracts predetermined portions of the revenue transaction data from the history report database 36 and stores the selected and extracted portions in the periodic database 42. The remainder of the process is the same as described above with reference to FIG. 3, whereas the data is compared, output, certain portions excluded, and then the remaining data is transmitted to a remote location.

Figure 6:
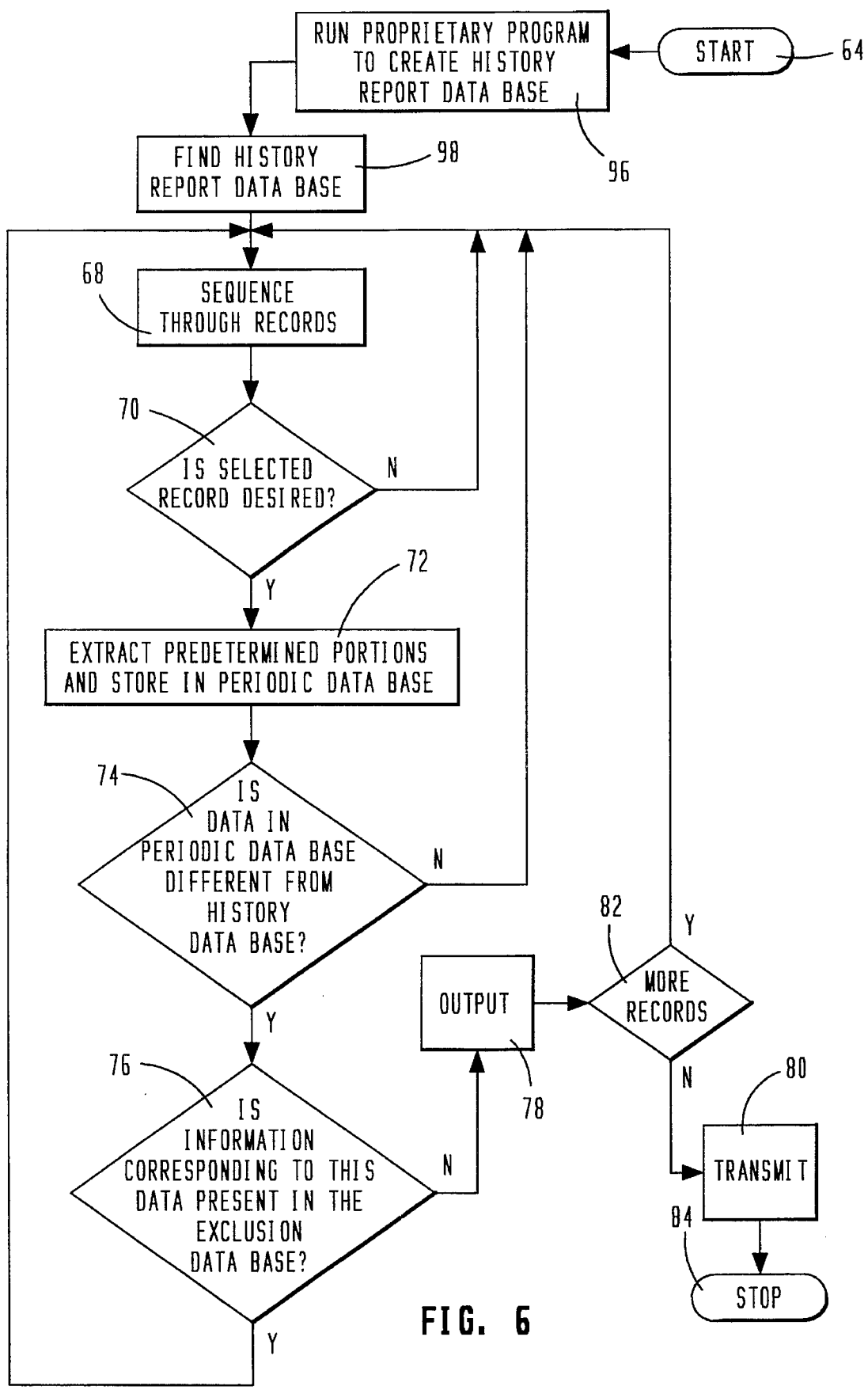
FIG. 6 illustrates a flowchart for an alternate embodiment of the system of the present invention.

Referring now to FIG. 6, there is illustrated a flowchart depicting one embodiment of the system of the present invention. The operation is the same as described above in FIG. 4, except that after the start block 64, the routine proceeds to function block 96 where the proprietary POS operating program that created the revenue transaction data and stored the revenue transaction data in the proprietary database, is used to run a proprietary history report program to create a history report that is stored in the history report database. The routine then proceeds to function block 98 to find the history report database created in function block 96. The routine then proceeds to function block 68 where it sequences through records and continues as described in FIG. 4 above until stop block 84 is reached.

In the system depicted in FIG. 6 and the flowchart associated therewith, the history report program is a program that is normally run by the retailer. For example, at the end of the day, a retailer may desire to have information displayed in the form of transactions that have occurred, i.e., the number of rentals, the price per transaction, etc. This gives the retailer an idea of how his business is progressing. Therefore, each POS operating system has the ability to generate some type of history report. The retailer has the option of either printing this to a printer or to a file. The embodiment described above with respect to FIG. 6 is operable to manipulate the program, i.e., generate the commands and instructions necessary to control the POS operating system in order to cause the POS operating system to generate the history report and store this history report as a "file", as opposed to printing it to a printer. In effect, all of the necessary information regarding revenue transactions is extracted from the main database and placed in a very simple format in this printer file. It is then only necessary to examine the printer file and extract the information therefrom. This is typically done at the end of the day whenever transaction information is required.

In summary, there has been provided a method and system for accessing revenue transaction data from a proprietary database which utilizes a standard point-of-sale operating system. The system selects and extracts predetermined portions of the revenue transaction data from a proprietary database, stores the relevant portions of the data in a periodic database, and compares it to a history database comprising the periodic database as it existed prior to the given time. The system then outputs only the data from the periodic database that is not present in the history database at a given time. Certain portions of this output may be excluded and this output can then be transmitted to a remote location.

Although the preferred embodiment has been described in detail, it should be understood that various changes, substitutions and alterations can be made therein without departing from the spirit and scope of the invention as defined by the appended claims.

What is claimed is:

1. A method for accessing revenue transaction data from a proprietary database created by a proprietary program to selectively extract the revenue transaction data therefrom, the revenue transaction data having a unique format associated therewith, comprising the steps of:

periodically selecting and extracting predetermined and fixed portions of the revenue transaction data from the proprietary database at given times in accordance with a selection template that defines the predetermined portions in an operation that is independent of the operation of the proprietary program, which fixed portions constitute a predetermined type of data that can be updated by the proprietary program and which given times occur after processing of data by the proprietary program and creation or updating of the fixed portions of the proprietary database;

storing as a periodic database the selected predetermined portions of the revenue transaction data;

generating and storing a history database comprising the periodic database as it existed prior to each of the given times;

comparing the periodic database at the given time to the history database;

outputting as output data only the data in the periodic database that is not present in the history database at the given time; and providing an exclusion database containing information corresponding to undesired data and outputting only the data in the periodic database that is not present in the history database and which does not correspond to the information in the exclusion database.

2. The method of claim 1 and further comprising the step of transmitting the output data to a remote location.

3. The method of claim 2 wherein the step of transmitting comprises transmitting the output data via a public telephone network.

4. The method of claim 1 wherein the step of periodically selecting occurs in response to a predetermined instruction that is executed during the operation of the proprietary program that generates the proprietary database.

5. The method of claim 4 wherein the predetermined instruction comprises the instruction that is executed when the proprietary program that generates the proprietary database is exited.

6. The method of claim 1 wherein the step of periodically selecting occurs at each of a number of predetermined times.

7. The method of claim 1 wherein the step of periodically selecting occurs in response to a menu selection from the proprietary program used to generate the proprietary database.

8. The method of claim 1 wherein the step of periodically selecting first translates the selected portions of the revenue transaction data to a second unique format and then selects the translation.

9. The method of claim 8 wherein the step of storing as a periodic data base the selected predetermined portions of the revenue transaction data further comprises storing the selected predetermined portions in the second unique format.

10. The method of claim 1 wherein the predetermined portions of the revenue transaction data include bar code, title, last rental date, turns and revenue.

11. A method for accessing revenue transaction data from a proprietary database created by a proprietary program to selectively extract the revenue transaction data therefrom, the revenue transaction data having a unique format associated therewith, comprising the steps of:

creating a history report database from the revenue transaction data using the proprietary program that created the revenue transaction proprietary database;

periodically selecting and extracting predetermined and fixed portions of the revenue transaction data from the history report database at given times in accordance with a selection template that defines the predetermined portions and in an operation that is independent of the operation of the proprietary program, which fixed portions constitute a predetermined type of data that can be updated by the proprietary program and which given times occur after processing of data by the proprietary program and creation or updating of the fixed portions of the proprietary database;

storing as a periodic database the selected predetermined portions of the history report database;

generating and storing a history database comprising the periodic database as it existed prior to each of the given times;

comparing the periodic database at the given time to the history database;

outputting as output data only the data in the periodic database that is not present in the history database at the given time; and providing an exclusion database containing information corresponding to undesired data and outputting only the data in the periodic database that is not present in the history database and which does not correspond to the information in the exclusion database.

12. The method of claim 11 and further comprising the step of transmitting the output data to a remote location.

13. The method of claim 12 wherein the step of transmitting comprises transmitting the output data via a public telephone network.

14. The method of claim 11 wherein the step of periodically selecting occurs in response to a predetermined instruction that is executed during the operation of the proprietary program that generates the proprietary database.

15. The method of claim 14 wherein the predetermined instruction comprises the instruction that is executed when the proprietary program that generates the revenue proprietary database is exited.

16. The method of claim 11 wherein the step of periodically selecting occurs at each of a number of predetermined times.

17. The method of claim 11 wherein the step of periodically selecting occurs in response to a menu selection from the proprietary program used to generate the proprietary database.

18. The method of claim 11 wherein the step of periodically selecting first translates the selected portions of the revenue transaction data to a second unique format and then selects the translation.

19. The method of claim 18 wherein the step of storing as a periodic database the selected predetermined portions of the revenue transaction data further comprises storing the selected predetermined portions in the second unique format.

20. The method of claim 11 wherein the predetermined portions of the transaction data include bar code, title, last rental date, turns and revenue.

21. A system for accessing revenue transaction data from a proprietary database created by a proprietary program to selectively extract the revenue transaction data therefrom, the revenue transaction data having a unique format associated therewith, comprising:

a selection and extraction device for periodically selecting and extracting predetermined and fixed portions of the revenue transaction data from the proprietary database at given times in accordance with a selection template that defines the predetermined portions in an operation that is independent of the operation of the proprietary program, which fixed portions constitute a predetermined type of data that can be updated by the proprietary program and which given times occur after processing of data by the proprietary program and creation or updating of the fixed portions of the proprietary database;

a first storage device for storing as a periodic database said selected predetermined portions of the revenue transaction data;

a first processing device for generating a history database comprising said periodic database as it existed prior to each of the given times;

a second storage device for storing said history database;

a second processing device for comparing said periodic database at the given time to said history database and outputting as output data only said data in the periodic database that is not present in said history database at the given time; and an exclusion database containing information corresponding to undesired data and outputting only the data in said periodic database that is not present in said history database and which does not correspond to the information in said exclusion database.

22. The system for accessing revenue transaction data of claim 21, further comprising a transmitting device for transmitting said output data to a remote location.

23. The system for accessing revenue transaction data of claim 22, wherein said transmitting device transmits said output data via a public telephone network.

24. The system for accessing revenue transaction data of claim 21, wherein said selection and extraction device operates in response to a predetermined instruction that is executed during the operation of the proprietary program that generates the proprietary database.

25. The system of claim 24 wherein said predetermined instruction comprises the instruction that is executed when the proprietary program that generates the proprietary database is exited.

26. The system for accessing revenue transaction data of claim 21, wherein said selection and extraction device operates at each of a number of predetermined times.

27. The system for accessing revenue transaction data of claim 21, wherein said selection and extraction device operates in response to a menu selection from the proprietary program used to generate the proprietary database.

28. The system for accessing revenue transaction data of claim 21, wherein said selection and extraction device first translates said selected portions of the revenue transaction data to a second unique format and then selects said translation.

29. The system for accessing revenue transaction data of claim 28, wherein said first storage device stores said selected predetermined portions in a second unique format.

30. The system for accessing revenue transaction data of claim 21, wherein the predetermined portions of the revenue transaction data include bar code, title, last rental date, turns and revenue.

31. A system for accessing revenue transaction data from a proprietary database created by a proprietary program to selectively extract the revenue transaction data therefrom, the revenue transaction data having a unique format associated therewith, comprising:

a history report database created from the revenue transaction data by the proprietary program;

a selection and extraction device for periodically selecting and extracting predetermined and fixed portions of the revenue transaction data from said history report database at given times in accordance with a selection template that defines said predetermined portions in an operation that is independent of the operation of the proprietary program, which fixed portions constitute a predetermined type of data that can be updated by the proprietary program and which given times occur after processing of data by the proprietary program and creation or updating of the fixed portions of the proprietary database;

a first storage device for storing as a periodic database said selected predetermined portions of said history report database;

a first processing device for generating a history database comprising said periodic database as it existed prior to each of the given times;

a second storage device for storing said history database;

a second processing device for comparing said periodic database at the given time to said history database and outputting as output data only the data in said periodic database that is not present in said history database at the given time; and an exclusion database containing information corresponding to undesired data and outputting only data in said periodic database that is not present in said history database and which does not correspond to the information in said exclusion database.

32. The system for accessing revenue transaction data of claim 31, further comprising a transmitting device for transmitting said output data to a remote location.

33. The system for accessing revenue transaction data of claim 32, wherein said transmitting device transmits said output data via a public telephone network.

34. The system for accessing revenue transaction data of claim 31, wherein said selection and extraction device operates in response to a predetermined instruction that is executed during the operation of the proprietary program that generates the proprietary database.

35. The system of claim 34 wherein said predetermined instruction comprises the instruction that is executed when the proprietary program that generates the proprietary database is exited.

36. The system for accessing revenue transaction data of claim 31, wherein said selection and extraction device operates at each of a number of predetermined times.

37. The system for accessing revenue transaction data of claim 31, wherein the selection and extraction device operates in response to a menu selection from the proprietary program used to generate the proprietary database.

38. The system for accessing revenue transaction data of claim 31, wherein said selection and extraction device first translates said selected portions of the revenue transaction data to a second unique format and then selects the translation.

39. The system for accessing revenue transaction data of claim 31, wherein said first storage device stores said selected predetermined portions in a second unique format.

40. The system for accessing revenue transaction data of claim 31, wherein said predetermined portions of said revenue transaction data include bar code, title, last rental date, turns and revenue.

* * * * *